Aug. 7, 1956 F. F. DAUENHAUER 2,757,785

VERTICAL HOP PICKER HAVING ENDLESS CARRIER CHAIN FOR HOP VINES, MOVING IN A VERTICAL PLANE

Filed Jan. 29, 1952 9 Sheets-Sheet 1

INVENTOR.
FLORIAN F. DAUENHAUER.
BY Munn + Liddy
ATTORNEYS.

INVENTOR.
FLORIAN F. DAUENHAUER
BY
Munn, & Liddy
ATTORNEYS

INVENTOR.
FLORIAN F. DAUENHAUER.
BY
Munn & Liddy
ATTORNEYS.

Aug. 7, 1956 F. F. DAUENHAUER 2,757,785

VERTICAL HOP PICKER HAVING ENDLESS CARRIER CHAIN FOR HOP VINES, MOVING IN A VERTICAL PLANE

Filed Jan. 29, 1952 9 Sheets-Sheet 4

INVENTOR.
FLORIAN F. DAUENHAUER.
BY
Munn + Liddy
ATTORNEYS.

INVENTOR.
FLORIAN F. DAUENHAUER
BY
Munn & Liddy
ATTORNEYS.

INVENTOR.
FLORIAN F. DAUENHAUER
BY
Munn & Liddy
ATTORNEYS

Aug. 7, 1956 F. F. DAUENHAUER 2,757,785

VERTICAL HOP PICKER HAVING ENDLESS CARRIER CHAIN FOR HOP VINES, MOVING IN A VERTICAL PLANE

Filed Jan. 29, 1952 9 Sheets-Sheet 7

INVENTOR.
FLORIAN F. DAUENHAUER
BY
Munn & Liddy
ATTORNEYS

INVENTOR.
FLORIAN F. DAUENHAUER
BY Munn & Liddy
ATTORNEYS

Aug. 7, 1956 F. F. DAUENHAUER 2,757,785

VERTICAL HOP PICKER HAVING ENDLESS CARRIER CHAIN FOR HOP VINES, MOVING IN A VERTICAL PLANE

Filed Jan. 29, 1952 9 Sheets-Sheet 9

INVENTOR.
FLORIAN F. DAUENHAUER
BY
Munn + Liddy
ATTORNEYS.

United States Patent Office 2,757,785

Patented Aug. 7, 1956

2,757,785

VERTICAL HOP PICKER HAVING ENDLESS CARRIER CHAIN FOR HOP VINES, MOVING IN A VERTICAL PLANE

Florian F. Dauenhauer, Santa Rosa, Calif.

Application January 29, 1952, Serial No. 268,840

6 Claims. (Cl. 198—179)

An object of my invention is to provide a vertical hop picker having endless carrier chain for hop vines, moving in a vertical plane, which is an improvement over the vertical hop picking machine shown in my copending application, Serial No. 179,722, filed August 16, 1950, and now Patent No. 2,677,378. In the copending case, I show an endless hop-carrying chain conveyor that has a portion for conveying hop vines between pairs of vertically movable hop picking fingers. The return portion of the endless hop-carrying chain that extends along the hop picking fingers, lies in the same horizontal plane as the portion that carries the vines between the picking fingers, but the return portion is spaced laterally therefrom. Moreover, I also disclose in the copending case, the endless hop-carrying chain as having an inclined portion extending from a hop vine feeding platform up to the hop picking finger part of the machine. Here again, the return chain part passing along the inclined portion is spaced laterally from the inclined hop vine carrying portion. This necessitated the use of cam rails at the feed and discharge ends of the machine for opening the jaws of vine grippers, carried by the chain, for permitting an operator to attach vines to the grippers at the feed end and for automatically releasing the vines at the discharge end of the machine.

In the present case, the endless hop-carrying chain conveyor has both of its reaches lying in the same vertical plane. This causes the jaws of the vine grippers to open automatically at the discharge end of the machine and release the vines that have had their hops removed. The jaws remain in open position as the vine grippers travel from the discharge end of the machine to the feed end. No cam rails are necessary at the feed and discharge ends of the machine.

A further object of my invention is to provide a device of the type described in which a swingable elevator boom is placed at the feed end of the machine for supporting the feed end of the carrier chain for hop vines. The boom can be swung so that its free end can be positioned adjacent to a hop vine carrying truck and this will permit an operator to unload hop vines one at a time, directly from the truck and attach them to the vine grippers at the feed end of the machine. After the truck has been emptied, the boom can be swung to another filled truck and the vine unloading and attaching process continued. The unloading platform at the feed end of the machine may be dispensed with if desired.

It should be understood, however, that the arrangement of the two reaches of the endless conveyor chain in a vertical plane is the principal object of my invention. The swingable elevator boom may be used to support the feed end of the conveyor or a fixed upwardly inclined guide member may take its place. The placing of the two reaches of the endless chain, one above the other, makes for a more compact machine. In addition the vine grippers, carried by the endless carrier chain, will open and close automatically, and at the proper time without the necessity of using cams for this purpose.

Other objects and advantages will appear in the following specification, and the novel features of the device will be particularly pointed out in the appended claims.

My invention is illustrated in the accompanying drawings forming a part of this application, in which.

While I have shown only the preferred form of my invention, it should be understood that various changes or modifications may be made within the scope of the appended claims without departing from the spirit and scope of the invention.

Figure 1:
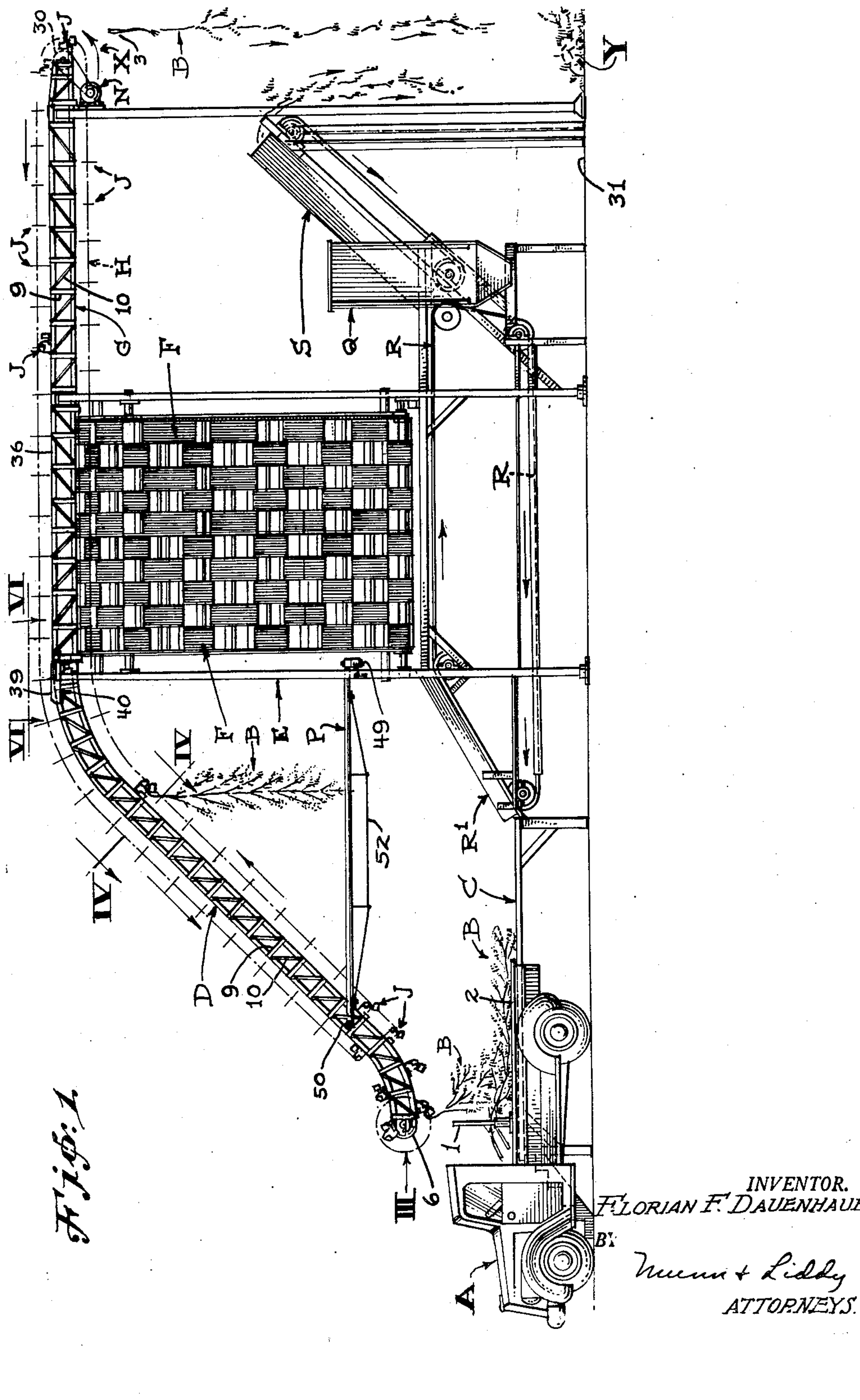
Figure 1 is a side elevation of the device.

In carrying out my invention, I make use of a truck or other vehicle, indicated generally at A in Figure 1, that is used to haul hop vines, indicated generally at B, from the field in which they are severed, to the hop picking machine. The truck A has a plurality of uprights 1 at the forward end of the truck body 2 and these uprights are spaced apart for receiving butt ends 3 of the hop vines. The truck and uprights 1 form the subject matter of my copending application on a Method and Apparatus for Loading and Transporting Hop Vines From Felds to Hop Picking Machines, Serial No. 257,238, filed November 20, 1951.

The truck is shown placed to one side of an unloading platform indicated generally at C in Figure 1. I will set forth hereinafter how the unloading platform may be dispensed with if desired and the hop vines be transferred directly from the truck A to the hop picking machine. The hop picking machine shown in the present case is similar in many respects to the machine shown in my copending application on a Method and Apparatus for Picking Hops, Ser. No. 179,722, filed August 16, 1950. In the copending case just referred to, an endless carrier has an inclined portion extending from an unloading platform up to the portion of the machine that has the hop picking units therein. The endless carrier comprises an endless chain that has its reaches extending from the unloading platform to the top of the hop picking units F and then the reaches extend along the top of the hop picking units, the return portion of the endless chain being positioned laterally from the feed portion.

In the present case, I provide an endless carrier H in which the feed and return portion of the chain lie in the same vertical plane. Again referring to Figure 1, it will be seen that I provide a downwardly inclined boom D that has its forward end positioned near the front of the platform C and its rear end extends to the forward top portion of a frame of the hop picking machine indicated generally at E. The frame E supports the hop picking units F, see Figure 1, which are of the same construction and operate in the same manner as the hop picking units shown in my copending application, Ser. No. 179,722. A horizontally disposed guide member G communicates with the boom D at the top of the frame E. The guide member G not only extends along the top of the hop picking units F, but in addition projects beyond the rear ends of these units a considerable distance for a purpose hereinafter described.

Figure 3:
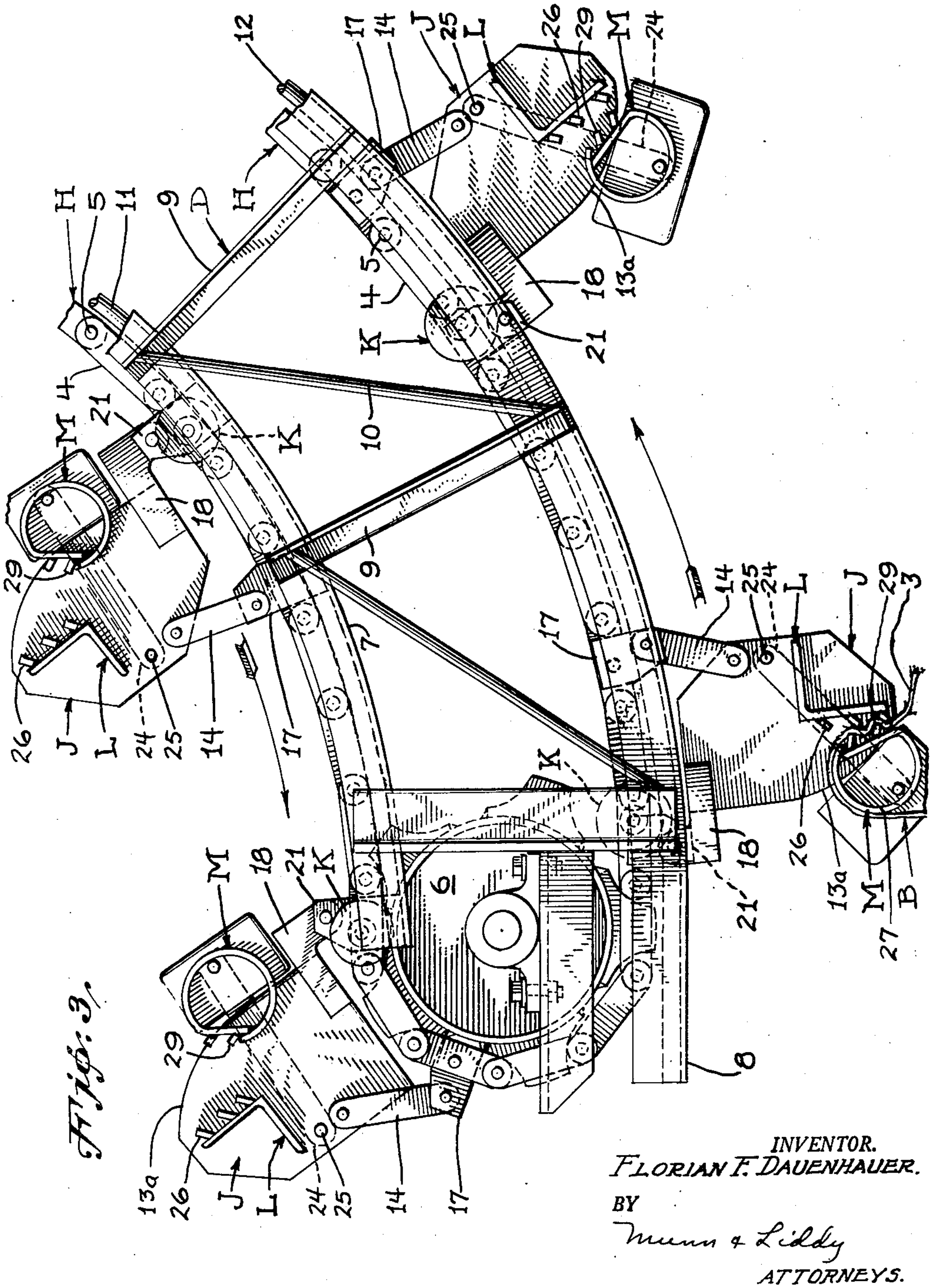
Figure 3 is an enlarged detail view of the feed end of the machine, as indicated by the circled portion III in Figure 1.

Referring to Figure 3, it will be seen that I show a portion of the hop vine endless conveyor H on a large scale and this same figure illustrates the forward or feed end of the boom D that is disposed a slight distance above the platform C or slightly above the truck body platform 2. The endless conveyor H is composed of a chain having a plurality of links 4 that are pivoted to each other at 5. Figure 3 illustrates the feed end of the chain being passed around an idler sprocket 6 that is rotatably mounted at the free end of the boom.

Figure 4:
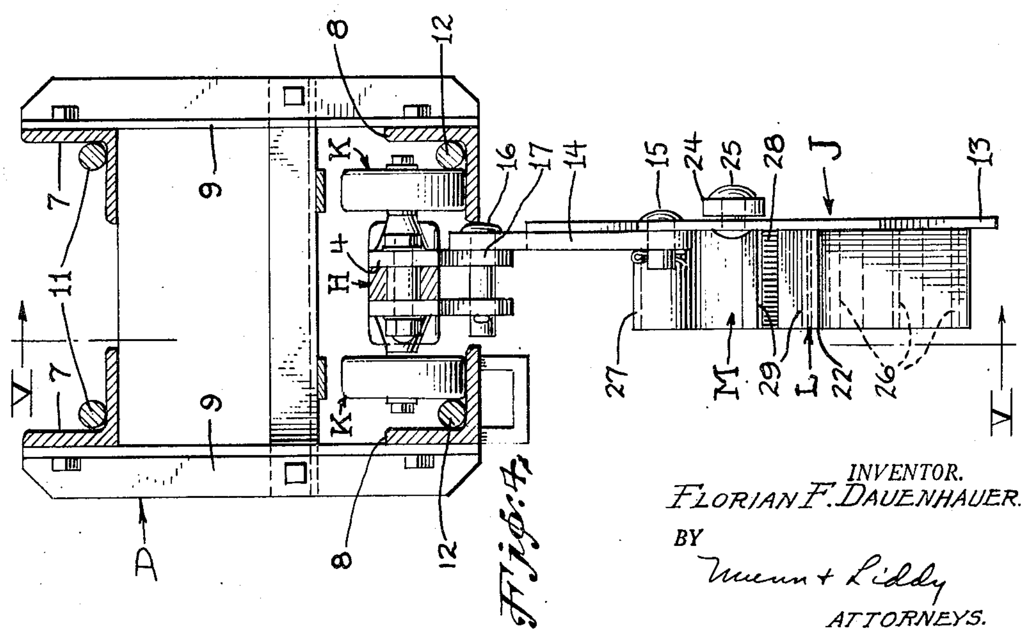
Figure 4 is an enlarged transverse section of a portion of the tracks on which the wheels ride that support the vine grippers, and is taken along the line IV—IV of Figure 1.

Referring to Figure 4, it will be noted that the boom D has an upper track composed of a pair of angle-irons 7—7 and a lower track composed of another pair of angle-irons 8—8. The endless carrier H is only shown on the lower tracks. The pair of angle irons 7—7 form the upper portion of the boom D and the other angle-irons 8—8 form the lower portion. Connecting angle-irons 9 extend between the tracks 7 and 8 on one side of the boom and like connecting angle-irons extend between the tracks 7 and 8 on the opposite side of the boom. Bracing members 10, see Figure 5, extend diagonally between adjacent angle-irons 9 arranged on the same side of the boom. It will also be noted from Figure 4 that each of the angle-irons 7—7 and 8—8 is provided with a spacing rod that is placed at the corner of each angle-iron. The angle-irons 7—7 have spacing rods 11—11 arranged at the corners and the angle-irons 8—8 have spacing and guide rods 12—12 also disposed at the corners of the angle irons. The purpose of the tracks 7 and 8 in the boom D is to carry movable vine grippers indicated generally at J in Figures 4 and 5. The vine grippers are somewhat the same in structure as the vine grippers shown in my copending application Serial No. 179,722.

Figure 5:
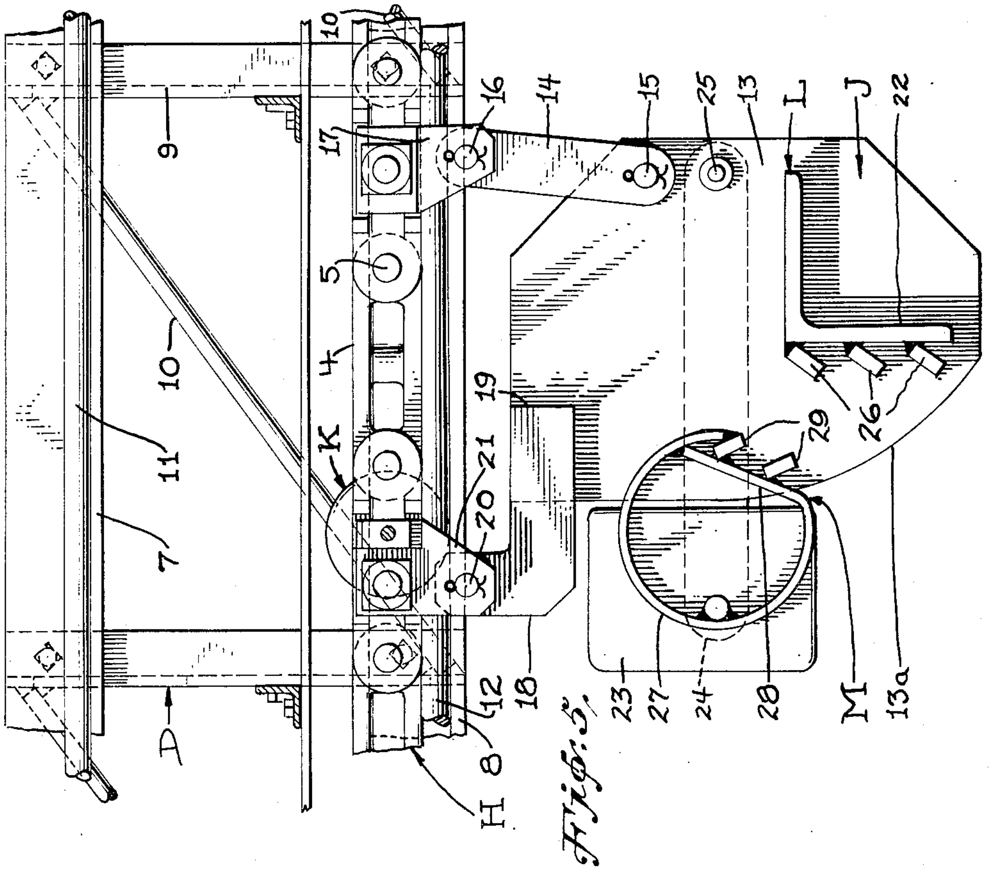
Figure 5 is a vertical section taken along the line V—V of Figure 4.

In the present case, the vine gripper J comprises a vertically arranged plate 13 that is supported at its forward edge by a link 14. The link is pivoted to the plate at 15 while the other end of the link is pivoted at 16 to a hanger 17, which in turn is carried by one of the links 4 of the endless hop vine carrier chain H. The vine gripper J illustrated in Figure 5, is designed to move to the right in this figure, and the rear end of the plate 13 has a fixed arm 18 rigidly secured to the plate as at 19. The arm 18 is L-shaped and has its free end pivotally connected at 20 to a rear hanger 21 that is secured to another link 4 in the endless chain H. I provide a pair of wheels K that are connected to the endless chain at a point disposed near the rear hanger 21. In Figures 3 and 4, several pairs of wheels K are illustrated and each pair is arranged adjacent to the L-shaped arm 18.

The vine gripping jaws L and M in the vine gripper J, are the same in construction as that shown in my copending application Ser. No. 179,722. The stationary jaw L comprises an angle-iron 22 that is welded to one face of the plate 13. The other jaw M is mounted on a plate 23 that in turn is carried by an arm 24 that is pivoted at 25 to the plate 13 so that the arm 24 can swing by gravity into either open position, shown in Figure 5, or in closed position, see Figure 3. The stationary jaw L has teeth 26 that are welded to the plate 13 and to the angle iron 22 so as to extend at an angle indicated in Figure 5 with respect to one side of the angle iron. The jaw M has a circular portion 27 around which the butt end of a vine may be placed. This circular portion merges into a straight portion 28. Teeth 29 are welded to the straight portion 28 of the jaw M and ride over the surface of the plate 13 during the swinging of the movable jaw. The teeth 29 are designed to swing toward the teeth 26 on the stationary jaw L.

In Figure 3, I show the swingable jaw M in closed position on the vine grippers J that have just passed around the idler sprocket 6. The plate 13 has a curved edge 13*a* so that the movable plate 23 can swing from the open to closed position and vice versa. Figure 3 illustrates the butt end 3 of a vine B passed around the circular portion 27 of the swingable jaw M and then the butt end extends between the teeth 26 and 29 of the two jaws L and M and is held in place. The weight of the vine B will tend to keep the swingable jaw M in engagement with the stationary jaw L and therefore the butt end 3 of the vine will be gripped by the teeth 26 and 29 of the two jaws and will be lifted as the lower reach of the chain H moves upwardly along the under side of the boom D. It should be noted that the butt end 3 of the vine B is passed over the circular portion 27 of the swingable jaw in a counter-clockwise direction so that the weight of the vine as it is suspended from the circular portion will tend to swing the jaw M against the jaw L and this will bring the teeth of the two jaws into frictional engagement with the butt end of the vine for supporting the vine.

The vine grippers J are spaced along the endless conveyor chain H and the conveyor chain has its lower reach extending from the free end or feed end of the boom D up to the juncture of the boom with the horizontal chain guide member G. The lower reach of the chain H as it passes along the guide member G, moves the vine grippers J between the picking conveyors F so as to carry the hop vines B between these picking conveyors. A detailed description of these conveyors need not be given in this case because they are of the same construction and operate in the same manner as shown in my copending application Serial No. 179,722. The horizontal guide member G extends beyond the rear of the picking units F and the hop vines are released from the vine grippers at the place indicated at X in Figures 1 and 18.

At the point X, the lower reach of the endless chain H passes around a drive sprocket 30 and then the remaining chain portion back to the feed sprocket 6, constitutes the upper reach of the endless conveyor H. The drive sprocket 30 may be operated by any mechanism desired, and I have indicated an electric motor N and this motor is operatively connected to the drive sprocket 30 for rotating it. The drive sprocket rotates about a horizontal axis and therefore the lower and upper reaches of the endless conveyor H will lie in the same vertical plane.

Figure 18:
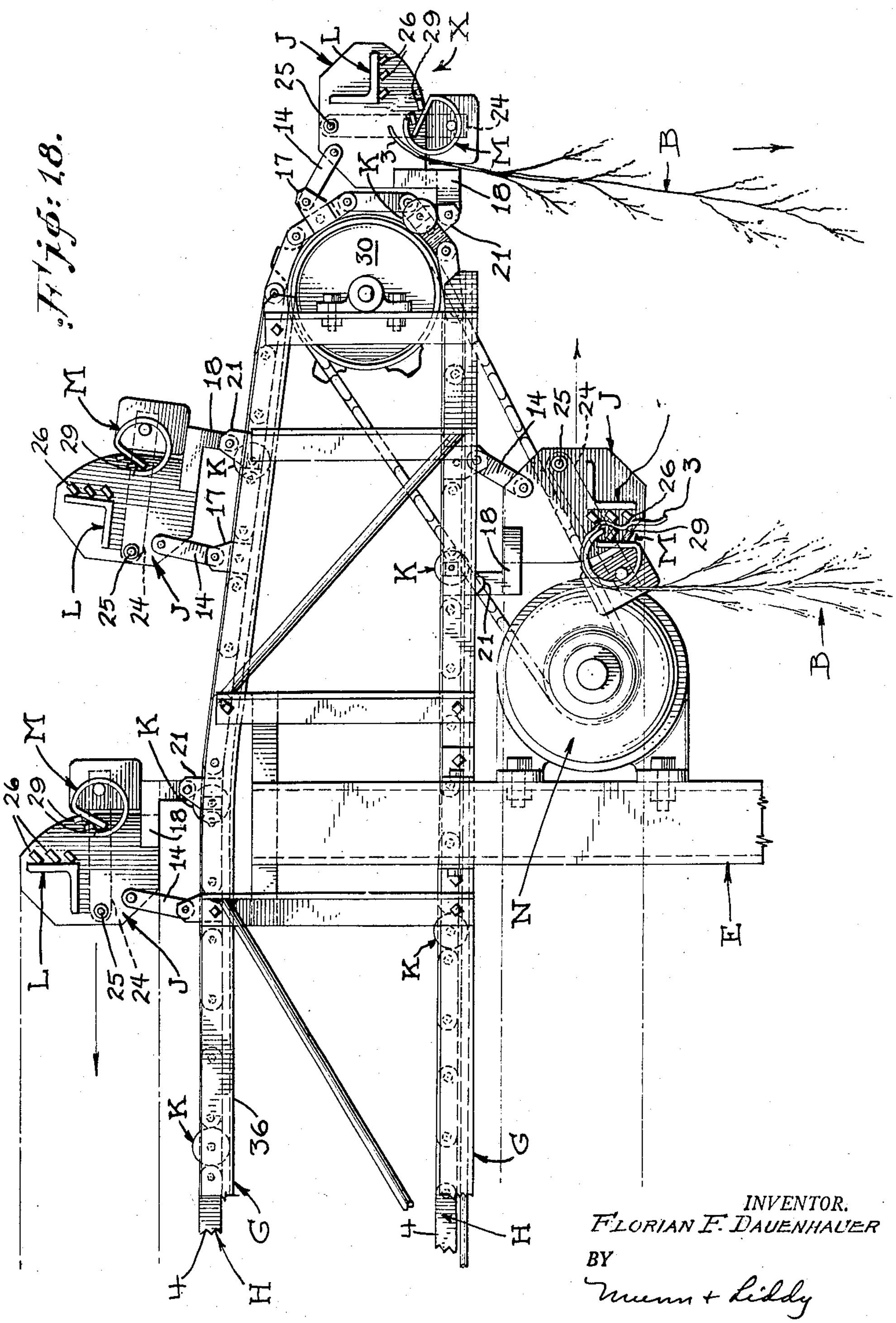
Figure 18 is an enlarged side elevation of the vine discharge end of the machine.

In Figure 18 I show an enlarged detail view of a portion of the endless chain H and its relation to the drive sprocket 30. It will be seen from this figure that as the vine grippers J are moved from a depending position as they are carried along by the lower reach of the conveyor, into an upwardly extending position as they are carried along by the upper reach, the swingable jaws M will automatically swing from closed position into open position with respect to the fixed jaws L. This movement will free the butt ends 3 of the vines B and permit them to drop on to the ground 31 at a place indicated generally at Y, see Figure 1. The hop vines that are dropped at the place Y have been stripped of their hops by the hop picking units F. The vine grippers remain in open position as they are moved along the upper reach of the endless conveyor H and the swingable jaw M will only swing into closed position with respect to the fixed jaw L as the vine grippers J move around the idler or feed sprocket 6 disposed at the front end of the boom D, see Figure 3.

It is best now to set forth the pivotal support for the boom D when it is desired to use a swingable boom with the hop picking machine rather than a fixed one. It is possible to have the device provided with a rigid boom of the same shape as shown in Figure 1 and when such a boom is used, the unloading platform C is also used. The trucks A are therefore brought up to points adjacent to the unloading platform and then an operator removes the hop vines B from the truck one at a time and in the reverse order from that in which they were stacked on the truck. These hop vines B are attached to the vine grippers J as the swingable jaw M of each gripper moves from open position to closed position.

When the boom D is swingably connected to the hop picking machine, the platform C may be dispensed with, and the boom swung into a desired position where an operator standing on the truck body 2 can remove the vines from the body and attach them to the vine grippers. During the unloading of the truck, a second loaded truck can be brought into a position near the first one and then when the first truck has been entirely unloaded, the boom D may be swung away from the first truck and toward the second truck where an operator standing on the second truck can transfer the hop vines from this truck to the vine grippers. This method of swinging the boom from truck to truck is repeated continuously during the operation of the machine.

Figure 6:
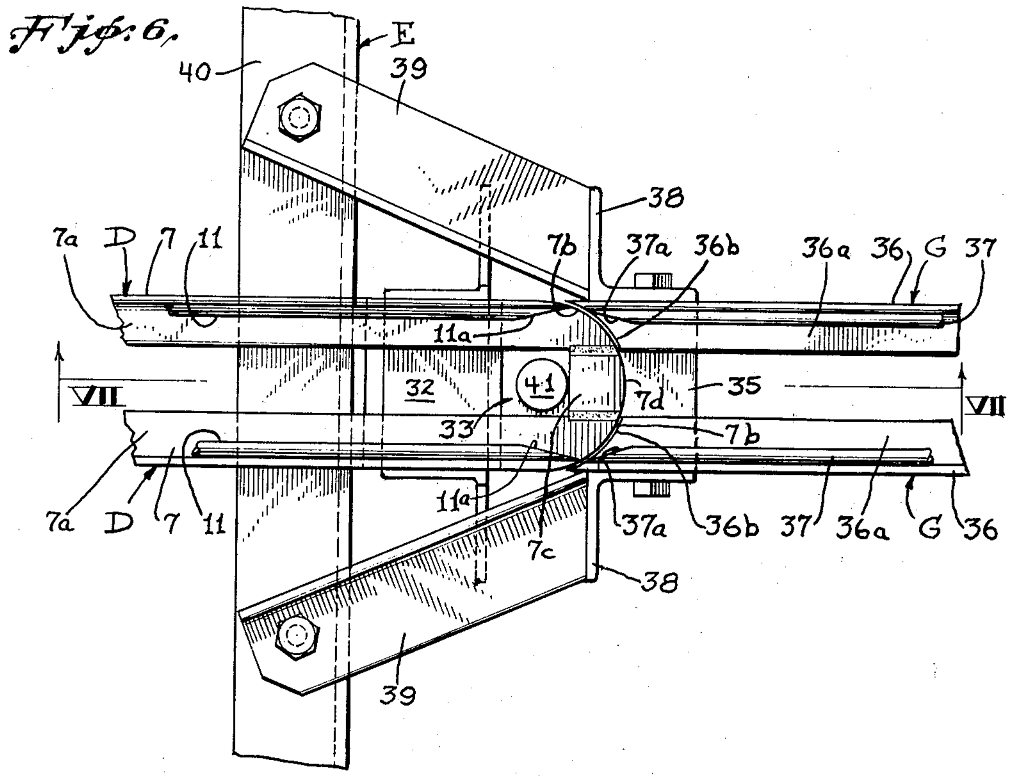
Figure 6 is an enlarged top plan view of the articulated portion of the track, when looking in the direction of the arrows VI—VI of Figure 1, the hop vine carrier chain being omitted.
Figure 7:
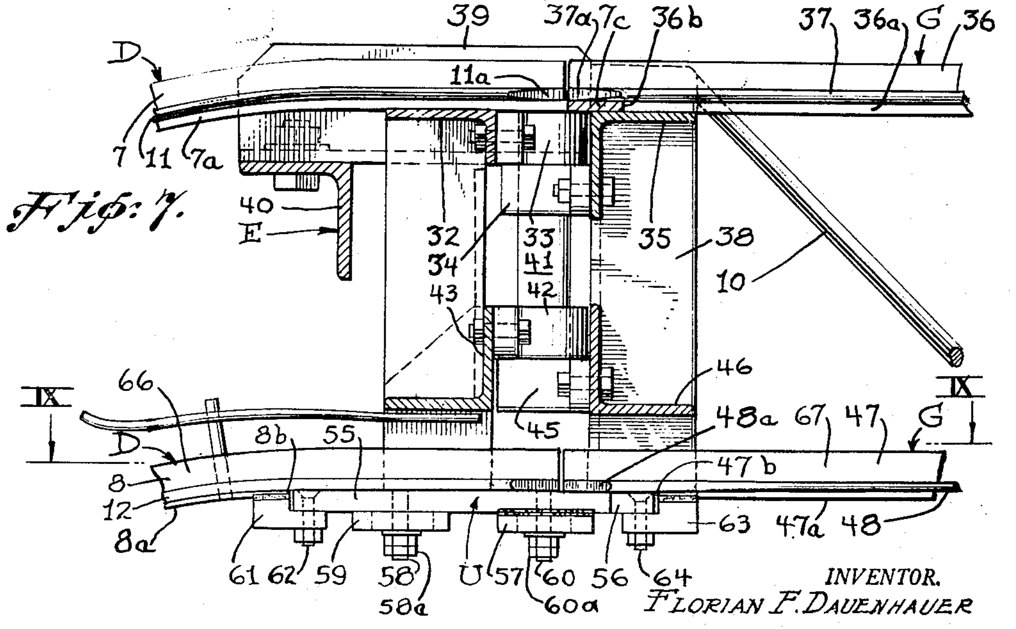
Figure 7 is a longitudinal and vertical section taken along the line VII—VII of Figure 6, the hop vine carrier chain being omitted.
Figure 8:
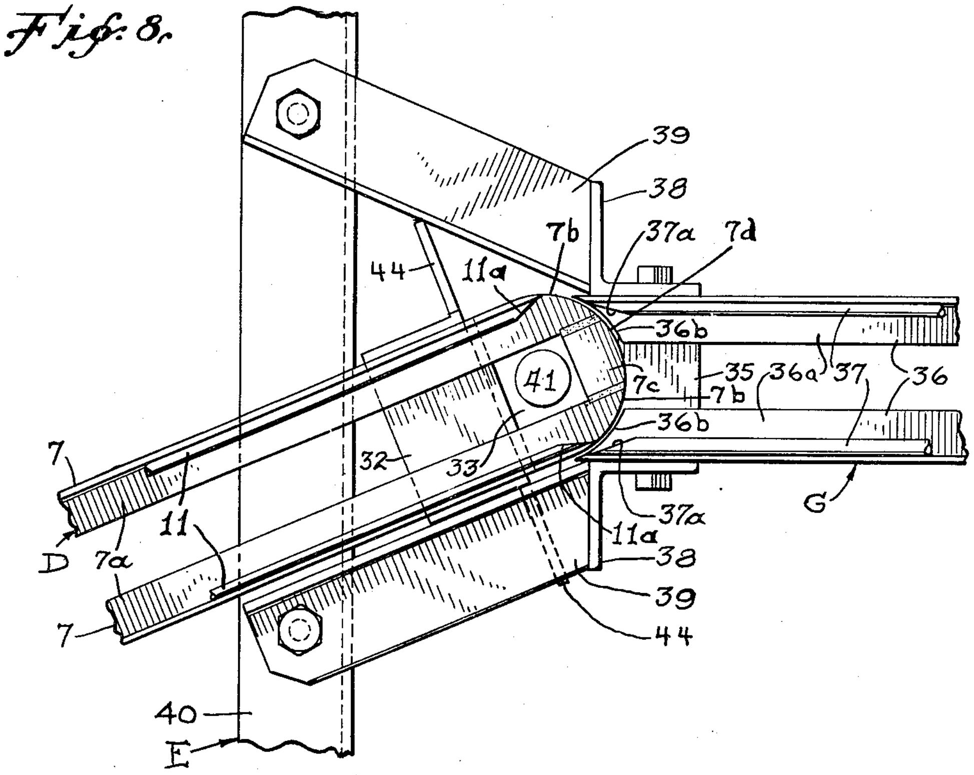
Figure 8 is a view similar to Figure 6, and shows the pivoted boom swung into an angular position with respect to the stationary portion of the track.

In Figures 6, 7 and 8, I show the forward end of the horizontal guide member G on a larger scale and I also show the pivoted end of the boom D on the same enlarged scale. In Figure 6 the upper tracks 7—7 on the boom D are illustrated and the spacing and wheel guide rods 11—11 are also shown. Figure 7 is a section along the line VII—VII of Figure 6 and illustrates one of the upper tracks 7 with its spacing and guide rod 11. The two upper tracks 7—7 are interconnected by an angle-iron 32, see Figure 7. This angle-iron carries a bearing 33 that is swingably mounted on a supporting bearing 34. Still referring to Figure 7, it will be seen that the supporting bearing 34 is connected to an angle-iron 35 and this angle-iron extends between the upper tracks 36—36 which are provided for carrying the upper reach of the endless chain H on the horizontal guide member G. These tracks are also formed with the wheel spacer rods 37—37 for guiding the wheels K of the vine grippers J.

In Figure 6, I show the angle-iron 35 supported by a pair of vertically extending angle-irons 38—38 and these in turn have bracing angle-irons 39—39 welded thereto.

The bracing angle-irons are disposed in a horizontal plane, but they flare outwardly as indicated in Figure 6. The free ends of the outwardly flared bracing angle-irons 39 are connected to a horizontal angle-iron 40 and this angle-iron is supported by uprights of the main frame E of Figure 1. I do not wish to be confined to any particular design of supporting frame structure, because it is obvious that the supporting structure may be built so as to maintain the guide member G in a horizontal position at the top of the frame E and also to provide a pivotal support for the upper end of the boom D. The supporting bearing 34 is not shown in Figure 8.

Referring back to the pivotal connection for the boom D, it will be seen from Figures 6 and 7 that I provide a pivot pin 41 and pass the upper end of this pin through the aligned bearings 33—34. The pin has its lower end passing through another bearing 42 which is connected to an angle-iron 43, see Figure 7, and the angle-iron in turn is operatively connected to the two lower tracks 8—8 of the boom D by vertical angle-irons 44 for supporting them. The angle-irons 32 and 43 are in turn interconnected by bracing members 44. The bearing 42 that is connected to the lower tracks 8 of the boom is swingably mounted on a supporting bearing 45 and this bearing is carried by an angle-iron 46. The two angle-irons 35—46 are interconnected by the vertical angle-irons 38. The pivot pin 41 also extends through the bearing 45 and in this way the upper end of the boom is pivotally connected to the forward end of the horizontal guide member G.

It is necessary that the wheels K on the endless chain H ride from the upper rails 36—36 on the guide G onto the rails 7—7 on the boom D without any interference thereto and this must hold true whether the boom is in alignment with the guide member G as indicated by the full lines in Figure 6, or is swung into either one of its extreme positions as shown in Figure 8, or any other position. The wheel supporting flanges **36*a* of the upper tracks 36—36, see Figures 6, 7 and 8, are provided with arcuate ends 36*b*. The left hand ends of the spacing rods 37, provided on the upper tracks 36, are chamfered at 37*a* so as not to extend beyond the arcuate portions 36*b***.

Coming to the upper tracks 7—7 of the boom D at their point of pivotal connection with the tracks 36, it will be seen from Figure 6 that the wheel supporting flanges *7a—7a* are provided with arcuate-shaped ends *7b* and these ends are interconnected by a flush plate *7c* that has its sides welded to the flanges *7a* and its top lying flush with the upper surfaces of the flanges *7a*. The upper surface of the plate *7c* is not only flush with the upper surfaces of the wheel supporting flanges *7a*, but the plate has an arcuate edge *7d* that interconnects with the arcuate edges *7b* and the three arcuate edges form a portion of a circle whose center is the axis of the pivot pin 41. Figure 8 illustrates how the arcuate edges *7b* and *7d* form the outer edge of what might be termed a turntable. The arcuate edges *36b* of the stationary flanges **36*a*** are also concentric with the arcuate edges *7b* and *7d* and have their center, the axis of the pivot pin 41. This structure permits the boom D to be swung into the angular position shown in Figure 8, and still the wheels K of the vine carriers J can travel from the flanges *36a* onto the flanges *7a*.

Figure 11:
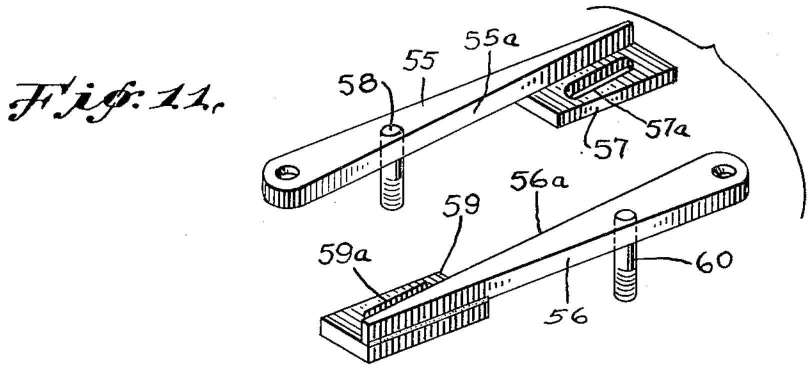
Figure 11 is a perspective view of the members used in forming an adjustable and pivotal connection between the lower track of the swingable boom and the adjacent portion of the stationary track.
Figure 12:
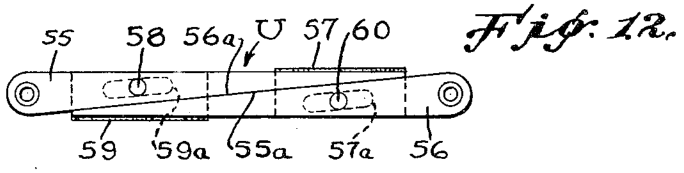
Figure 12 is a top plan view of the two members of Figure 11 interconnected with each other to form an adjustable and pivotal rail portion between the lower track of the swingable boom and the adjacent portion of the stationary track.
Figure 13:
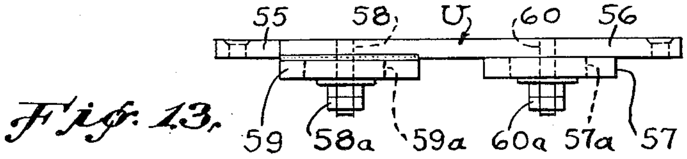
Figure 13 is a side elevation of Figure 12.

It is best now to describe how the lower boom tracks 8 are interconnected with the stationary tracks 47. A different mechanism must be used because the plates 13 of the vine grippers J depend from the lower reach of the carrier chain H and move in the space provided between the two lower tracks. In Figures 11 to 13, inclusive, I show a track spanner indicated generally at U and two of these interconnect the lower tracks 8 of the boom D with the lower tracks 47 of the stationary and horizontal guide member G. A top plan view of the track spanner U is indicated in Figure 12 and a side elevation in Figure 13.

Each track spanner U comprises a pair of triangular-shaped arms 55 and 56, see Figure 12. In Figure 11, I show the triangular arm 55 provided with a horizontal plate 57 that is integral with the arm and projects in front of the inclined edge 55*a* of the arm. The plate 57 has a slot 57*a* whose longitudinal axis parallels the inclined edge 55*a*. The arm 55 has a depending stud 58 that is threaded for a portion of its length.

In like manner, the triangular-shaped arm 56 is provided with a horizontal plate 59 that is integral with the arm and projects in front of the inclined edge 56*a* of the arm. The plate 59 has a slot 59*a* whose longitudinal axis parallels the inclined edge 56*a*. A stud 60 depends from the arm 56 and is threaded for a portion of its length.

Figure 12 shows the two arms 55 and 56 arranged side by side with their inclined edges 55*a* and 56*a* slidably contacting one another. The stud 58 is slidably received in the slot 59*a* of the plate 59 and the stud 60 is slidably received in the slot 57*a* of the plate 57. Figure 13 shows nuts 58*a* and 60*a* mounted on the studs 58 and 60, respectively and slidably connecting the arms 55 and 56 together. The construction is such that the arms 55 and 56 can be extended or contracted with respect to each other to the limits permitted by the slots 57*a* and 59*a* and at all positions of the two arms, their inclined edges 55*a* and 56*a* will contact with each other. An elongative rail or track spanner is thus provided.

Figure 9:
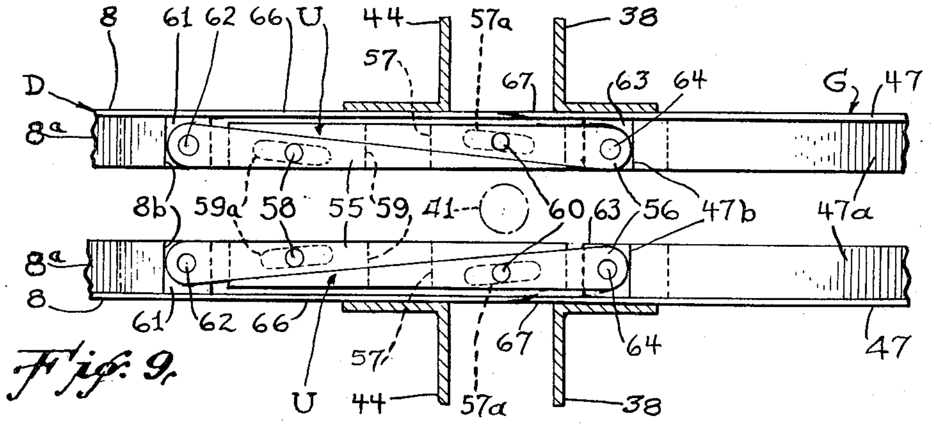
Figure 9 is a horizontal section taken along the line IX—IX of Figure 7, and illustrates the adjustable connection between the lower tracks of the pivoted boom and the stationary track portion.
Figure 10:
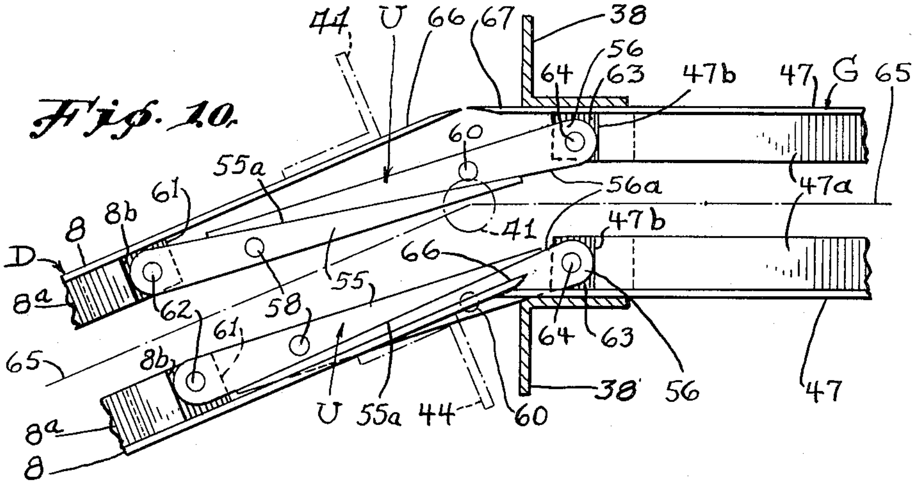
Figure 10 is a view similar to Figure 9, and shows the pivoted boom swung into an angular position with respect to the stationary portion of the track.

In Figure 10, I provide two of the track spanners U, a right and a left hand one. Both Figures 7 and 10 show how the two lower tracks 8 on the boom D, have their inwardly extending flanges 8*a* cut away at 8*b* and how brackets 61 are secured to the flanges 8*a* and pivotally support the arms 55 at 62. In like manner, the two lower tracks 47 on the horizontal guide member G, have their inwardly extending flanges 47*a* cut away at 47*b*, see Figures 9 and 10, and brackets 63 are secured to the flanges 47*a* and pivotally support the arms 56 at 64. The boom D is in alignment with the horizontal guide member in Figure 9, while in Figure 10, the boom has been swung into an angular position about the pivot pin 41 in a counter-clockwise direction. The track spanner U, disposed below the median dash line 65 in Figure 10 has contracted and swung about its pivotal supports 62 and 64. The other track spanner U, disposed above the median dash line 65 has been elongated and has swung about its pivotal supports 62 and 64.

The guide rods 12 and 48 are not shown in Figures 9 and 10 because the purpose of these figures is to illustrate the operation of the track spanners. The side flanges 66 of the lower tracks 8 of the boom D extend a considerable distance beyond the ends 8*b* of the tread flanges 8*a*. The side flanges 67 of the lower tracks 47 of the horizontal guide member G also extend beyond the ends 47*b* of the tread flanges 47*a*. The side flanges 66 and 67 are free to swing over the upper surfaces of the track spanners U as the boom is moved into the desired angular position. The rod guides 11 are chamfered at 11*a* in Figure 8 and the rod guides 37 are chamfered at 37*a*.

The wheels K of the vine gripper J will ride over the track spanners U as the vine grippers move from the boom D onto the horizontal guide G. The track spanners will permit the plates 13 of the vine grippers J to extend downwardly between the lower tracks 8—8 of the boom and the lower tracks 47—47 of the guide G. There will be no interference offered to the vine grippers J, regardless of the angular position assumed by the boom between its extremes of swing.

Figure 2:
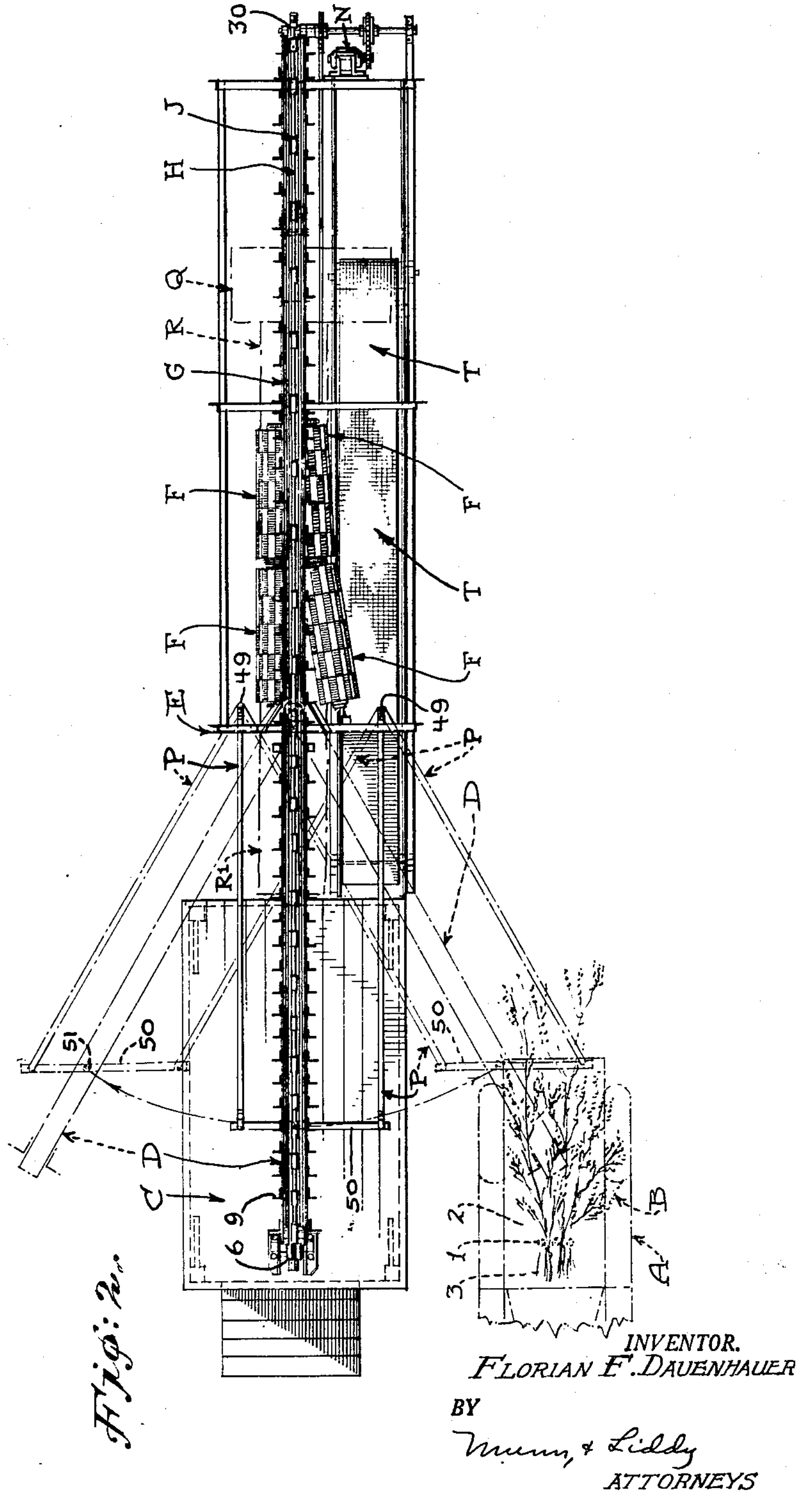
Figure 2 is a top plan view of Figure 1.
Figures 14, 15, 16, 17:
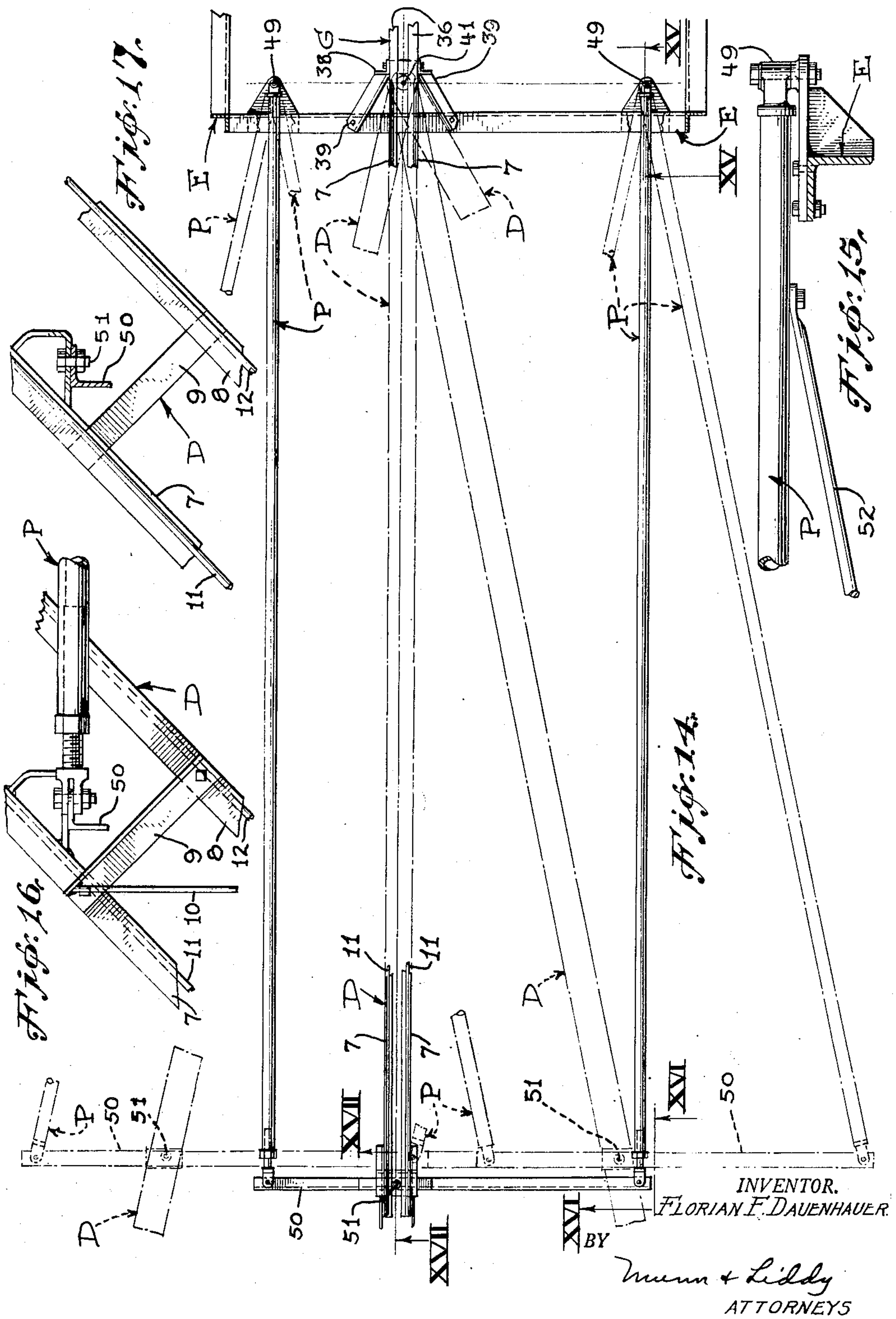
Figure 14 is an enlarged top plan view of the hinged boom and the pivoted supporting arms therefor, the hop vine carrier chain being omitted.
Figure 15 is an enlarged longitudinal section through the pivoted support for one of the boom supporting arms and is taken along the line XV—XV of Figure 14.
Figure 16 is an enlarged side elevation showing the outer end of one of the boom supporting arms and its pivotal connection with the cross piece that pivotally supports the boom, and is looking in the direction of the arrows XVI—XVI of Figure 14.
Figure 17 is an enlarged longitudinal section through the pivotal supporting connection between the cross piece, carried by the outer ends of the two boom arms and the boom and is taken along the line XVII—XVII of Figure 14.

In Figures 1, 2 and 14, I show supporting arms P for the lower free end of the boom D. These arms are pivoted at 49 to the frame E. The free ends of the arms P are interconnected by a cross piece 50 and this cross piece in turn is pivoted to the boom D at 51. The arms P are in the naturme of radius rods and they swing about their pivots 49 which lie in the same vertical plane as the pivot pin 41 for the boom D. The cross piece 50 will remain parallel to the front of the supporting frame E at all times and therefore the supporting arms P form a parallelogram with the cross piece 50 and the front of the frame E. These arms are swung when the boom is swung and will support the boom in any of its angular positions. The arms may be reinforced by tie rods 52 if desired, see Figures 1 and 15.

The hop picking machine illustrated in Figure 1 is provided with the usual trommel indicated generally at Q. An endless screen conveyor R is designed to carry any hop branches, stems and the like that are picked by the hop picking units F, to the trommel Q. It will also be seen from Figure 1 that when the platform C is used, any branches from the hop vines, remaining on the platform, can be moved and deposited upon the upwardly inclined portion R1 of the endless conveyor R. These hop branches are then conveyed to the trommel Q, as set forth in my copending application, Ser. No. 179,722.

The trommel Q works in cooperation with the arm picker indicated generally at S, in Figure 1, and described and claimed in my copending application, Serial No. 179,724, filed August 16, 1950, and entitled Apparatus for Picking Hops From Hop Branches and Clusters and for Separating Leaves and Stems Therefrom. The arm picker S will deliver the picked branches to the same position Y that receives the picked hop vines that have been released at the point X from the vine grippers. I have not shown in Figure 1 how the hops are completely separated from the stems and leaves and are then packed, because this feature is clearly shown in my application Serial No. 179,722, and forms no part of the present invention. Figure 2, however, does illustrate the conveyor T that extends along the side of the machine and receives hops and carries these to the series of separating belts, not shown, for cleaning the hops of all foreign matter. The particular arrangement of the conveyors R and T and the trommel Q and arm picker S is not of prime importance in this case, because these elements do not form any part of the present invention.

The hop picking units F when looking down on the machine in plan view as in Figure 2, are arranged to form a V-shaped throat or entrance, into which the suspended hop vines B are carried by the vine grippers J. I show two endless picking units forming one side of the passage through which the vines are conveyed and I further show two endless picking units arranged on the other side of the passage. The endless picking units are disposed in a vertical position and the upright reaches arranged in confronting relation form the opposite sides of the vine receiving passage and these confronting reaches are moved downwardly.

Each unit F has groups of hop picking fingers arranged in checkerboard fashion on the endless picker. The fingers on the reaches forming the vine receiving passage are moved downwardly to strip the vines of hops in the novel manner set forth in my copending application, Ser. No. 179,722. The picking units on one side of the vine receiving passage are angularly disposed with respect to the units on the other side so that the passage will be narrowed as the vines move therethrough and the picking fingers will therefore remove hops from the vines more effectively.

I claim:

1. In a device of the type described: a frame having a pair of tracks with tread portions; a boom pivoted to the frame and having a pair of tracks with tread portions and constituting an extension of the first-named tracks; a pair of track spanners; each track spanner being pivotally connected to one track on the boom and pivotally connected to an associate track on the frame; each track spanner comprising two triangular members having their inclined sides in contact with each other; and means carried by the members for maintaining the inclined sides in contact with each other while permitting a limited longitudinal movement of one member with respect to the other; the upper surfaces of the members lying flush with the tread portions of the tracks to which they are pivotally connected, and constituting a continuous tread portion between the same two tracks.

2. In a vine-gripper conveyor for a vertical hop picker having pairs of vertically arranged hop-picking units: a chain guide having an entrance and exit end and extending along the tops of the units and positioned between the pairs; said chain guide having upper and lower tracks lying in the same vertical plane; a pivoted boom extending from the entrance end of the chain guide and having a downwardly inclined portion; said boom being mounted for swinging about a vertical axis that is positioned at the entrance end of the chain guide; said boom being provided with upper and lower tracks communicating with the upper and lower tracks, respectively of the chain guide at the entrance end thereof; the boom tracks having downwardly inclined portions and the boom having a free end positioned lower than the chain guide and being provided with a sprocket; a second sprocket positioned at the exit end of the chain guide and disposed at a higher elevation than the boom sprocket; both of said sprockets being rotatable about horizontal axes; an endless carrier chain trained around both sprockets and having an upper reach movable along the upper tracks of both the chain guide and boom, and having a lower reach disposed vertically therebelow and movable along the lower tracks of both the chain guide and boom; supporting means for the chain and bearing on the tracks of both chain guide and boom; and a plurality of vine grippers spaced along the endless chain and being movable along the upper and lower tracks of both the chain guide and the boom.

3. The combination as set forth in claim 2; in which each carrier includes a stationary jaw and a gravity-actuated jaw coacting therewith; the latter jaw being pivotally supported for swinging into closed position with respect to the stationary jaw when the carrier is moving along the lower tracks of the chain guide and boom, and swinging into open position relative to the stationary jaw when the carrier moves around the second sprocket from the lower tracks on the chain guide to the upper tracks.

4. In a vine gripper conveyor; a movable chain having upper and lower reaches with a carrier plate secured to the lower reach and depending therefrom for movement therewith; a stationary jaw fixed to the said plate; a swingable plate supported by the carrier plate, and having a movable jaw thereon disposed for movement by gravity toward the fixed jaw; the movable jaw having an upper curved portion defining a saddle over which the butt end of a hop vine may be looped, with the butt end of the vine gripped between the jaws, and the main part of the vine depending from the movable jaw; whereby the wegiht of the vine on the movable jaw will aid in forcing the movable jaw toward the fixed jaw to increase the gripping effect between the jaws; said carrier plate projecting upwardly when moved by the upper reach; whereby the movable jaw will swing away from the fixed jaw.

5. In a vine-gripper conveyor: a movable endless chain supported to define upper and lower reaches; a vine gripper suspended from the lower reach of the chain and movable thereby; said gripper having a fixed jaw; a link-arm pivotally connected to the gripper at a point above the fixed jaw and carrying a movable jaw that is swingable toward and away from the fixed jaw as the link-arm swings; the fixed jaw leading the movable jaw when the gripper is moved by the lower reach and the movable jaw being movable toward the fixed jaw by gravity into closed position for gripping a vine butt disposed between the jaws; the gripper projecting above the upper reach when moving with this reach and the movable jaw being swingable by gravity away from the fixed jaw into open position with respect to the fixed jaw as the gripper is carried from the lower to the upper reach.

6. In a vine gripper conveyor: a movable endless chain supported to define upper and lower reaches; leading and trailing hangers secured to this chain to move therewith; a link having one end thereof pivotally connected to the leading hanger; a carrier plate pivotally attached to the other end of said link; an arm connected to the carrier plate and being pivotally secured to the rear hanger; the carrier plate having a stationary jaw fixed thereto; a link-arm pivotally connected near one end thereof to the carrier plate, and having a swingable plate secured to the other end thereof; a movable jaw secured to the swingable plate to move therewith; the movable jaw being swingable toward and away from the stationary jaw; the carrier plate depending from the lower reach when moving with this reach and the movable jaw being swingable by gravity into closed position relative to the stationary jaw for gripping a vine butt disposed therebetween; the carrier plate projecting above the upper reach when moving with this reach and the movable jaw being swingable by gravity away from the stationary jaw into an open position with respect to the latter jaw.

References Cited in the file of this patent

UNITED STATES PATENTS

| | | |
|---|---|---|
| 252,960 | Moore | Jan. 31, 1882 |
| 1,090,966 | Berghoefer | Mar. 24, 1914 |
| 1,126,696 | Brigham | Feb. 2, 1915 |
| 1,190,337 | Stecher | July 11, 1916 |
| 1,548,278 | Phillips et al. | Aug. 4, 1925 |
| 2,064,728 | Hinds | Dec. 15, 1936 |
| 2,237,197 | Pomieraniec | Apr. 1, 1941 |
| 2,250,933 | Manierre | July 29, 1941 |
| 2,274,793 | Keating | Mar. 3, 1942 |
| 2,448,063 | Thys | Aug. 31, 1948 |
| 2,700,452 | Regimbal et al. | Jan. 25, 1955 |